(12) United States Patent
Bauer et al.

(10) Patent No.: US 9,746,150 B2
(45) Date of Patent: Aug. 29, 2017

(54) HEADLIGHT ASSEMBLY COMPRISING LIGHT-CONDUCTING RODS FOR A HEADLIGHT

(71) Applicant: ZIZALA LICHTSYSTEME GMBH, Wieselburg (AT)

(72) Inventors: Friedrich Bauer, Bergland (AT); Erik Pirringer, Wieselburg (AT); Udo Maier, Herzogenburg (AT)

(73) Assignee: ZKW GROUP GMBH, Wieselburg an der Erlauf (AT)

( * ) Notice: Subject to any disclaimer, the term of this patent is extended or adjusted under 35 U.S.C. 154(b) by 0 days.

(21) Appl. No.: 14/765,445

(22) PCT Filed: Dec. 10, 2013

(86) PCT No.: PCT/AT2013/050242
§ 371 (c)(1),
(2) Date: Aug. 3, 2015

(87) PCT Pub. No.: WO2014/121310
PCT Pub. Date: Aug. 14, 2014

(65) Prior Publication Data
US 2015/0362144 A1    Dec. 17, 2015

(30) Foreign Application Priority Data
Feb. 5, 2013    (AT) ................ A 50088/2013

(51) Int. Cl.
*G02B 6/24*        (2006.01)
*G02B 6/43*        (2006.01)
(Continued)

(52) U.S. Cl.
CPC ......... *F21S 48/1241* (2013.01); *F21S 48/115* (2013.01); *F21S 48/1154* (2013.01);
(Continued)

(58) Field of Classification Search
CPC .. F21S 48/1241; F21S 48/215; F21S 48/2268; F21S 48/145; F21Y 2101/02;
(Continued)

(56) References Cited

U.S. PATENT DOCUMENTS 6,056,426 A  *  5/2000  Jenkins ............... B60Q 1/0011
                                                          362/511
7,347,595 B2 *  3/2008  Brun .................... B60Q 1/0011
                                                          340/435

(Continued)

*Primary Examiner* — Alan Cariaso
*Assistant Examiner* — Mark Tsidulko
(74) *Attorney, Agent, or Firm* — Eversheds Sutherland (US) LLP

(57) ABSTRACT

The invention relates to a lamp unit (1) for a headlight, in particular a motor vehicle headlight, the lamp unit (1) comprising multiple light sources (2), a light guide unit (3), and a downstream projector lens (4), the light guide unit (3) having multiple light guides (30), each light guide (30) having one light decoupling surface (30*a*) and one light coupling surface (30*b*), and each light source (2) coupling light exactly into a light guide (30) assigned to it through a light coupling surface (30*b*). The invention provides that the light sources (2) and the light coupling surfaces (30*b*) of the light guides (30) have light conducting rods (10) arranged between them, which are joined into at least one light conducting rod bundle (100), each light source (2) coupling light essentially exclusively into the light conducting rod coupling areas (10*a*) of the light conducting rods (10) assigned to the respective light source (2), the light of an assigned light source (2) that exits from the light conducting rod decoupling areas (10*b*) being coupled essentially exclusively into the light coupling surface (30*b*) of the light guide (30) assigned to the respective light source (2).

30 Claims, 4 Drawing Sheets

(51) Int. Cl.
  *F21S 8/10* (2006.01)
  *F21V 8/00* (2006.01)
  *G02B 6/06* (2006.01)
  *F21Y 115/10* (2016.01)

(52) U.S. Cl.
  CPC ....... *F21S 48/1258* (2013.01); *F21S 48/1291* (2013.01); *F21S 48/1335* (2013.01); *F21S 48/1747* (2013.01); *G02B 6/0006* (2013.01); *G02B 6/0008* (2013.01); *G02B 6/0078* (2013.01); *G02B 6/06* (2013.01); *F21Y 2115/10* (2016.08)

(58) Field of Classification Search
  CPC .... G02B 6/0006; G02B 6/0008; G02B 6/001; G02B 6/4298; D10B 2401/20
  USPC .......................... 362/511, 507, 551, 554, 556
  See application file for complete search history.

(56) References Cited

U.S. PATENT DOCUMENTS

| | | | | |
|---|---|---|---|---|
| 8,582,943 B2* | 11/2013 | Alkemper | ......... | C03B 37/01211 385/124 |
| 8,831,396 B1* | 9/2014 | Price | .................... | G02B 6/0045 362/551 |
| 8,864,328 B2* | 10/2014 | Toyota | ................. | G02B 6/0008 362/511 |
| 8,957,428 B2* | 2/2015 | Jagt | ........................ | H01L 33/44 257/88 |
| 9,346,395 B2* | 5/2016 | Sato | ......................... | F21V 9/16 |

* cited by examiner

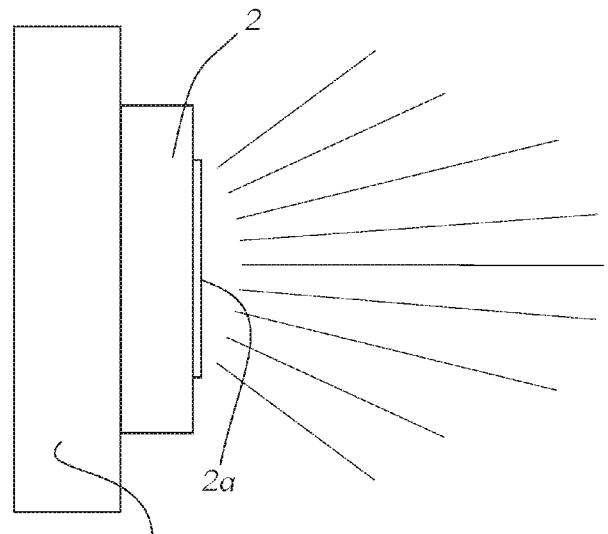
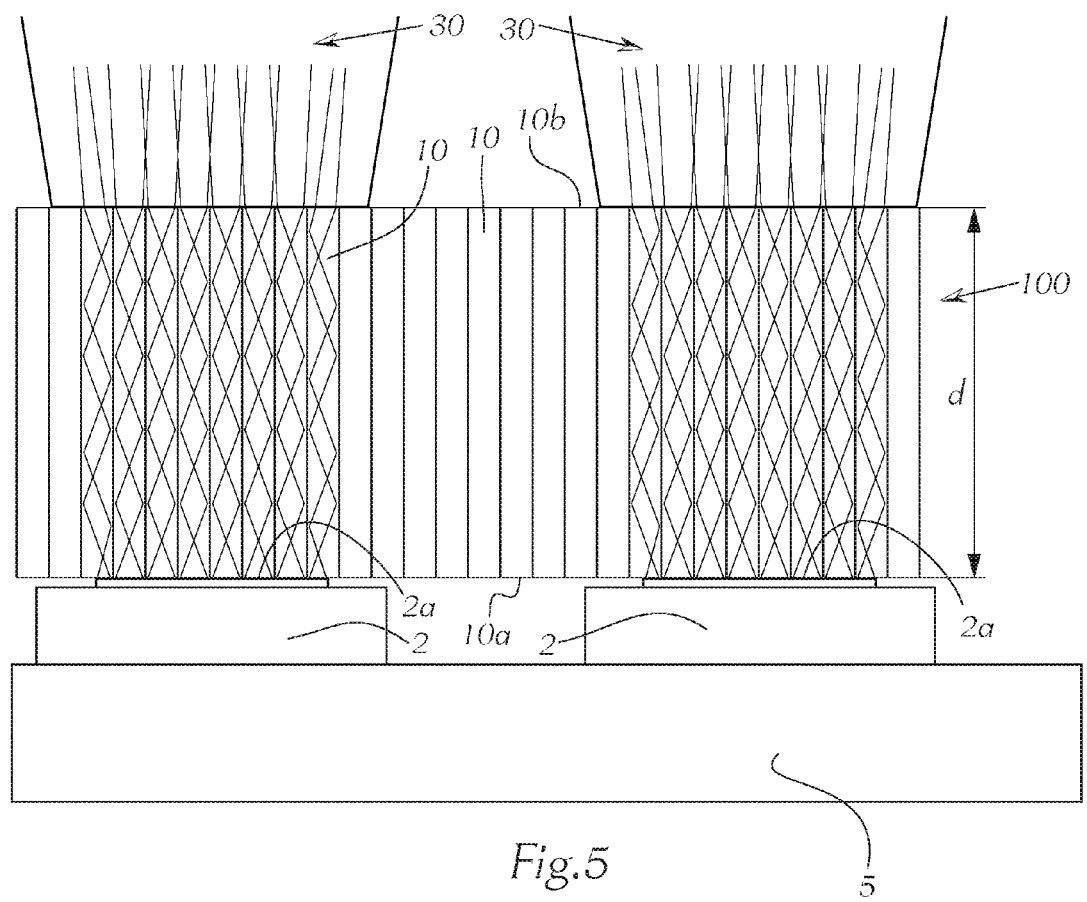

HEADLIGHT ASSEMBLY COMPRISING LIGHT-CONDUCTING RODS FOR A HEADLIGHT

The invention relates to a lamp unit for a headlight, in particular a motor vehicle headlight, the lamp unit comprising multiple light sources, a light guide unit, and a downstream projector lens, the light guide unit having multiple light guides, each light guide having one light decoupling surface and one light coupling surface, and each light source coupling light exactly into a light guide assigned to it through a light coupling surface.

The invention also relates to a vehicle headlight for a motor vehicle with at least one such lamp unit.

The above-mentioned lamp unit permits light functions such as, e.g., construction of a low beam pattern or a high beam pattern from multiple partial patterns. These partial patterns can be individually controlled by individually controlling the light sources, so that, for example, targeted parts of the light pattern can be cut out or dimmed, or only certain parts of the light pattern can be turned on or operated in dimmed mode. This makes it possible to control the light pattern in almost any way, depending on the driving situation.

Functions that can be realized with this technology are, e.g., partial high beams, in which lighted segments of the high beam pattern are turned off to reduce glare on the oncoming traffic; shifting the low beam light center position (cf. curve light); reducing the forward light pattern to reduce glare on the oncoming traffic when the road is wet (bad weather light), etc.

The individual light segments in the light pattern are produced by means of light guides that are joined into a light guide unit; these light guides radiate the light from the artificial light sources concentrated in the direction of the beam. The light guides have a relatively small cross section, and therefore each of them emits the light of the individual light source assigned to it in a very concentrated form in the direction of the beam. In this connection, AT 510 437 A4 discloses a light module that has a light guide in the form of an optical fiber, referred to there as a light tunnel, and multiple light sources.

In theory, the light guides can be light conducting bodies in which the light coupled in is totally reflected through the light coupling surface and then exits again through the light exit surface. In this case, a light guide unit consists of a number of such light conducting bodies arranged next to one another and connected with one another, or preferably made as a single piece.

The light guides can also be designed as reflectors, and form a hollow tube, so to speak, on whose one open side light is coupled in, reflected in the tube, and re-radiated at the other open side. Thus, the light guide units consist of a number of the light guides described above arranged next to one another, which are separated from one another by partitions, preferably as thin as possible.

As a rule, such a light guide unit is made of plastic; it is also made with walls that are as thin as possible, at least in the area between adjacent light guides, to allow undesired optical side effects to be minimized.

However, such light guide units are easily damaged or destroyed, especially in the light guides' coupling areas, because of thermal and optical loads.

To eliminate this problem, it is possible to consider the use of a thermally stable plastic, especially one that is suitable for high temperatures. However, it is necessary for the light guide unit in whose light guides the coupled light is supposed to propagate to have a light-reflecting layer, especially one that is highly reflective, applied to them, preferably by sputtering, so that the light can propagate in the light guides and not be absorbed.

However, this greatly limits the possible selections among the plastics that can be used, since many plastics that are suitable for high temperatures cannot have a reflective layer sputtered on to them, or this cannot be done very well.

The use of transparent plastics has also turned out to be unsuitable, since in this case not only is there thermal damage to the material, but a yellowing effect can also occur.

If the light sources, i.e., the LED light sources, are positioned at a sufficiently large distance from the light coupling areas of the light guides, there is a strong, undesired loss of efficiency of the light sources.

The use of silicone material for the light guide unit gives it substantially greater thermal stability, however it also needs to be manufactured with a holder, as a rule made of plastic, so that the problem portrayed above results again, and can lead to damage or destruction of the holder.

Positioning a simple, optically transparent glass plate between the light sources and the light guide unit does produce thermal decoupling, however then there is crosstalk between the individual light guides, i.e. light sources couple the light they emit not only into the exactly one light guide assigned to them, but rather also into other light guides, so that when a certain light source is activated not only one light segment illuminates the area in front of the vehicle, as desired, but rather several light segments in the light pattern are projected, which is undesired.

It is a goal of the invention to solve the above-described problem.

The invention achieves this goal with a lamp unit [of the type] mentioned at the beginning by arranging, between the light sources and the light coupling surfaces of the light guides, light conducting rods that are joined together into at least one light conducting rod bundle, wherein each light source couples light essentially exclusively into the coupling areas of the light conducting rods assigned to the respective light source, and wherein light the exiting from the decoupling areas of the light conducting rods of an assigned light source is coupled essentially exclusively into the light coupling surface of the light guide assigned to the respective light source.

The interposition of at least one optical element in the form of a light conducting rod bundle between the light sources and the light guide unit can thermally decouple the light guide unit from the light sources, so that the light guide unit experiences no thermal interference due to the light sources.

The inventive structure of the interposed (at least one) element in the form of a light conducting rod bundle, consisting of multiple light conducting rods, in which the input light propagates by means of total reflection, allows a light source to be exactly projected onto the coupling area of the light guide assigned to it, preventing a light source from coupling light into another light guide than the one assigned to it. The smaller the cross section of the individual light conducting rods, i.e., the more light conducting rods are used to project a light source onto the assigned coupling area of the light guide, the more exactly the light source is projected onto the coupling area.

The fact that the light sources or their light exit surfaces do not, as a rule, lie directly against one another, but rather are a certain distance away one another, also reliably ensures, if the light conducting rods have a correspondingly small diameter, that a light source does not, not even to a small extent (or only to an irrelevant extent), couple light into a light guide not assigned to it.

A specific embodiment of the invention provides that a number of light conducting rods is joined into a fiber rod, and that the at least one light conducting rod bundle consists of a number of such fiber rods, so that each light source couples light into a number of such fiber rods.

Thus, a number of fiber rods forms a so-called fiber rod bundle, i.e., the fiber rods, each of which in turn consists of a number of light conducting rods, are joined into a fiber rod bundle. Thus, the terms "fiber rod bundle" and "light conducting rod bundle" designate the same optical element.

As can be inferred from DE 10 2010 052 479 A1, it is preferable for the number of light conducting rods arranged in a fiber rod to be 7, 19, 37, 61, 91, etc.

Joining the light conducting rods in a light conducting rod bundle or the fiber rods into a fiber rod bundle has the advantage that when the inventive lamp unit is assembled, tolerances do not have to be taken into consideration, or have to be taken into consideration only to a small extent, other than would be the case if, for example, only a single totally reflecting light conducting body were arranged between each light source and each light coupling area of a light guide.

Here it is especially advantageous if light conducting rods are joined into exactly one light conducting rod bundle, which means the same thing as the fiber rods also being joined into exactly one fiber rod bundle (in the case in which light conducting rods are joined into fiber rods).

This has the advantage that the light sources and the light guide unit only need to have a single additional optical element incorporated between them, whose lateral slippage in directions perpendicular to a normal to the light exit surfaces of the light sources is completely insignificant, as long as the number of light conducting rods is sufficiently large, since if the resolution is high enough (i.e., if the number of light conducting rods is sufficiently large) the light exit surface is projected almost 1:1 onto the light coupling area of the assigned light guide, and only small quantities of light get into adjacent light conducting rods that do not couple light into the assigned light coupling area. In addition, this light does not, for the most part, or even at all, get into unassigned light guides, so that there also cannot be detrimental optical effects.

To allow the light conducting rods to be packed as densely as possible, the light conducting rods have a square, or preferably hexagonal, cross section.

For this reason for the fiber rods also have a square or preferably hexagonal cross section.

The production of the inventive light conducting rods, and possibly fiber rods formed on them, is described in detail in DE 10 2010 052 479 A1, for example.

Thus, the outer contour of the light conducting rods or fiber rods is square, or preferably hexagonal. This gives the light conducting rods or fiber rods a high packing density, as described in DE 10 2010 052 479 A1.

For reasons having to do with production engineering, it can be advantageous for the light conducting rods of a fiber rod to be surrounded by a covering, preferably a glass covering.

Such a glass covering can be provided to hold together the light conducting rods while the fiber rods are being manufactured, and then become a component of the fiber bundle, as described in DE 10 2010 052 479 A1.

To achieve optimal total reflecting properties in the light conducting rods, the light conducting rods can be made in the form of glass rod/tube systems, with a cladding glass as a tube and a core glass as a rod, the core glass being surrounded by the cladding glass.

Then it is preferable for the core glass to have a refractive index that is larger than that of the cladding glass.

This allows the transmission of light as a consequence of reflection at the interface of the inner and outer glass in a light conducting rod.

To make the bundle mechanically stable, it is advantageous for the light conducting rods of a light conducting rod bundle to be connected together, preferably fused together.

In the same way, it can be advantageous for the light conducting rods of a fiber rod to be connected together, preferably fused together.

It is also advantageous for the fiber rods of a fiber rod bundle to be connected together, preferably fused together.

This produces mechanically homogeneous fiber rods or mechanically homogeneous fiber rod bundles.

A specific space-saving embodiment of the invention provides that the light conducting rods of a light conducting rod bundle and/or the fiber rods of a fiber rod bundle run parallel to one another.

Thus, the light conducting rods or fiber rods preferably run in parallel, however of course in theory they can be curved in any way.

It is also provided that the at least one light conducting rod bundle is arranged at a light source distance from the light sources, the at least one light conducting rod bundle preferably having the same distance to all assigned light sources.

This light source distance is the normal distance from the light source's light exit surface to the light coupling surface of the light conducting rod bundle; this light coupling surface of the light conducting rod bundle is formed by the light coupling surfaces of the light conducting rods or the light coupling surfaces of the fiber rods.

As was already described at the beginning, it is preferable for there to be exactly one light conducting rod/fiber rod bundle into which all light sources couple light. In the case in which there are two or more light conducting rod/fiber rod bundles lying next to one another, it is preferable for all bundles to have the same distance to the light sources assigned to each of them.

It is especially advantageous for the light source distance to approach zero or preferably be zero.

This can ensure that light is actually coupled only into the assigned light conducting rods, that is, into light conducting rods that couple light directly into the assigned light guide, or miss the assigned to light guide partly or entirely, but do not do so into another light guide that is not assigned. The term "allowable" light conducting rods means light conducting rods that do not couple light from a light source into the light guide assigned to the light source, or do so only partly, but also do not couple its light into another light guide. This can be realized by separating the light exit surfaces of adjacent light-emitting diodes from one another.

This makes it possible to avoid or at least minimize light crosstalk and light losses.

It is also provided that the at least one light conducting rod bundle is arranged at a light guide unit distance from the light coupling surfaces of the light guide unit, this light guide unit distance once again preferably being zero.

Once again, direct contact of the light guides against the bundle can avoid or at least minimize light losses and/or crosstalk.

In the prior art, the light sources are separated from the light guides for thermal decoupling of the light guides. However, this separation has produced scattering losses and crosstalk problems, that is the coupling of light from light sources into unassigned light guides. Interposition of a light conducting rod bundle can eliminate this problem and simultaneously thermally decouple the light sources and the light guides. Now, to avoid crosstalk and scattering losses between the light sources and the light conducting rod bundle and between the light conducting rod bundle and the light guides, it is preferable that the separation between these units be zero.

In the light conducting rods, light propagates as a consequence of total reflection. Light beams that do not meet the total reflection condition, that is impinge on the cladding of the light conducting rod at an angle smaller than the critical angle for total reflection, exit from the light conducting rod into which they were coupled. To prevent these light beams from coupling into an unassigned light guide, it is also preferable for the thickness of the at least one light conducting rod bundle, i.e., the distance between the surface of the light conducting rod bundle facing the light sources and the surface of the light conducting rod bundle facing the light guide unit, has or exceeds a defined minimum value, which is selected so that light that exits from the side of a light conducting rod assigned to a light source at most gets into allowable light conducting rods.

In this regard, a higher number (greater density) of light conducting rods is also advantageous—the more light conducting rods that must be traversed by a light beam that enters them because it does not meet the total reflection condition, the weaker it becomes. If a light beam is sufficiently weakened in this way before it enters an unassigned light guide, then it is already weak enough that its intensity is negligible.

The thickness must also be selected in such a way that the light guides are sufficiently thermally decoupled from the light sources. Thus, the thickness is also dependent on the material used in the light conducting rod bundle, that is, its thermal conductivity. Typically, the thickness is on the order of a few millimeters.

A specific embodiment provides that the at least one light conducting rod bundle is plate-shaped.

Typically, there is exactly a single light conducting rod bundle. However, there can also be two or more light conducting rod bundles arranged directly adjacent to one another, one after the other in the light exit direction.

This forms a stack, so to speak, of two or more bundles lying one after the other in the light exit direction.

The optical fibers typically have a constant refractive index over their radius. Thus, going outward from the longitudinal centerline of the light conducting rod, in a section normal to this longitudinal centerline, in the direction of the cladding of the light conducting rod, the core material of the optical fiber has a constant refractive index.

However, it can also be advantageous for the light conducting rods to be gradient-index rods. In such gradient-index light conducting rods, the refractive index of the core material is not constant, as described above, but rather decreases in the outward direction. This means that a light beam in the light conducting rod does not travel in a straight line between two reflections, but rather follows a quasi sinusoidal course, so that even light beams with a steep angle of incidence, which under some circumstances will not meet the total reflection condition, are deflected in such a way that they do not exit from the light conducting rod when they reach its edge.

It is also advantageous for the light sources to be LEDs, each LED light source comprising at least one light-emitting diode.

It is preferable for each LED light source to be separately controllable, allowing it to be turned on or off and/or dimmed separately; preferably each light-emitting diode of an LED light source is separately controllable, allowing it to be turned on or off and/or dimmed separately.

The invention is explained in detail below using the drawing, which shows a sample embodiment of it. The figures are as follows:

FIG. 4 shows a light source with a schematic depiction of its emission pattern; and FIG. 5 shows two light sources with an upstream light conducting rod bundle.

Figure 1:
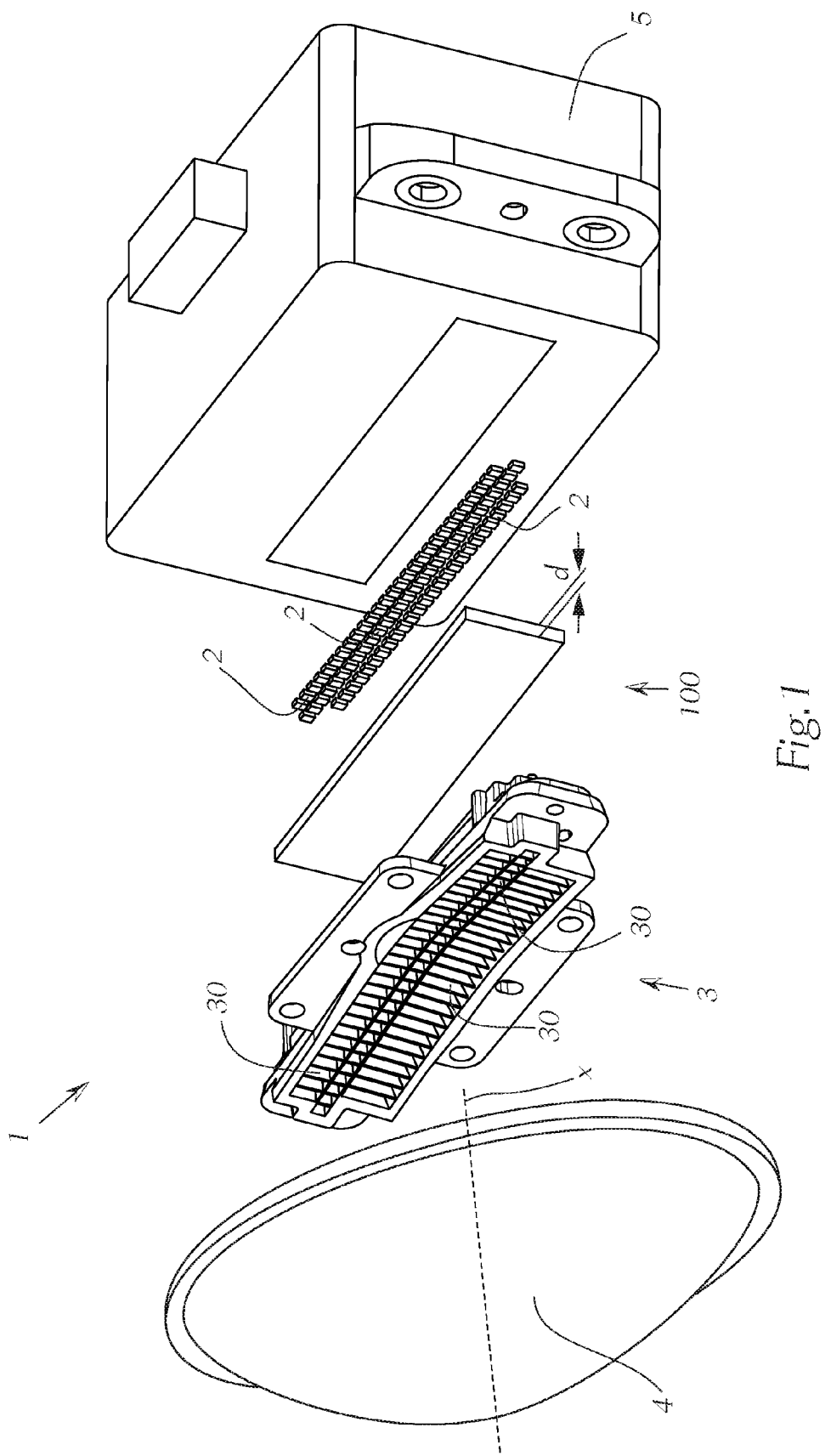
FIG. 1 shows a schematic perspective exploded view of an inventive lamp unit.

FIG. 1 shows an inventive lamp unit 1 for a motor vehicle headlight consisting of multiple light sources 2, a light guide unit 3 with multiple light guides 30, and a downstream projector lens 4. Each light guide 30 has a light decoupling surface 30a, and each light source 2 couples light through a light coupling surface 30b exactly into the light guide 30 assigned to it (concerning this see especially FIG. 2). The light sources 2 are arranged on a common carrier 5, for example a heat sink.

Light sources 2 are LEDs, each LED light source 2 comprising at least one or—as in this example—exactly one light-emitting diode. Such a light-emitting diode 2 has a light exit surface 2a. Preferably, each LED light source 2 is separately controllable, allowing it to be turned on or off and/or dimmed separately.

The light guides 30 in light guide unit 3 are next to one another, and in the example shown in FIG. 1, arranged in three rows lying on top of one other. These light guides 30 are oriented essentially in the direction of an optical axis x belonging to projector lens 4.

In the embodiment shown in FIG. 1, the light guides 30 are designed as reflectors, so they form a hollow tube, so to speak, and have light decoupling surfaces that are set up to radiate the light in the direction of downstream projector lens 4. Thus, the light decoupling surfaces, like the light coupling surfaces, are limited openings in light guide unit 3.

Figure 2:
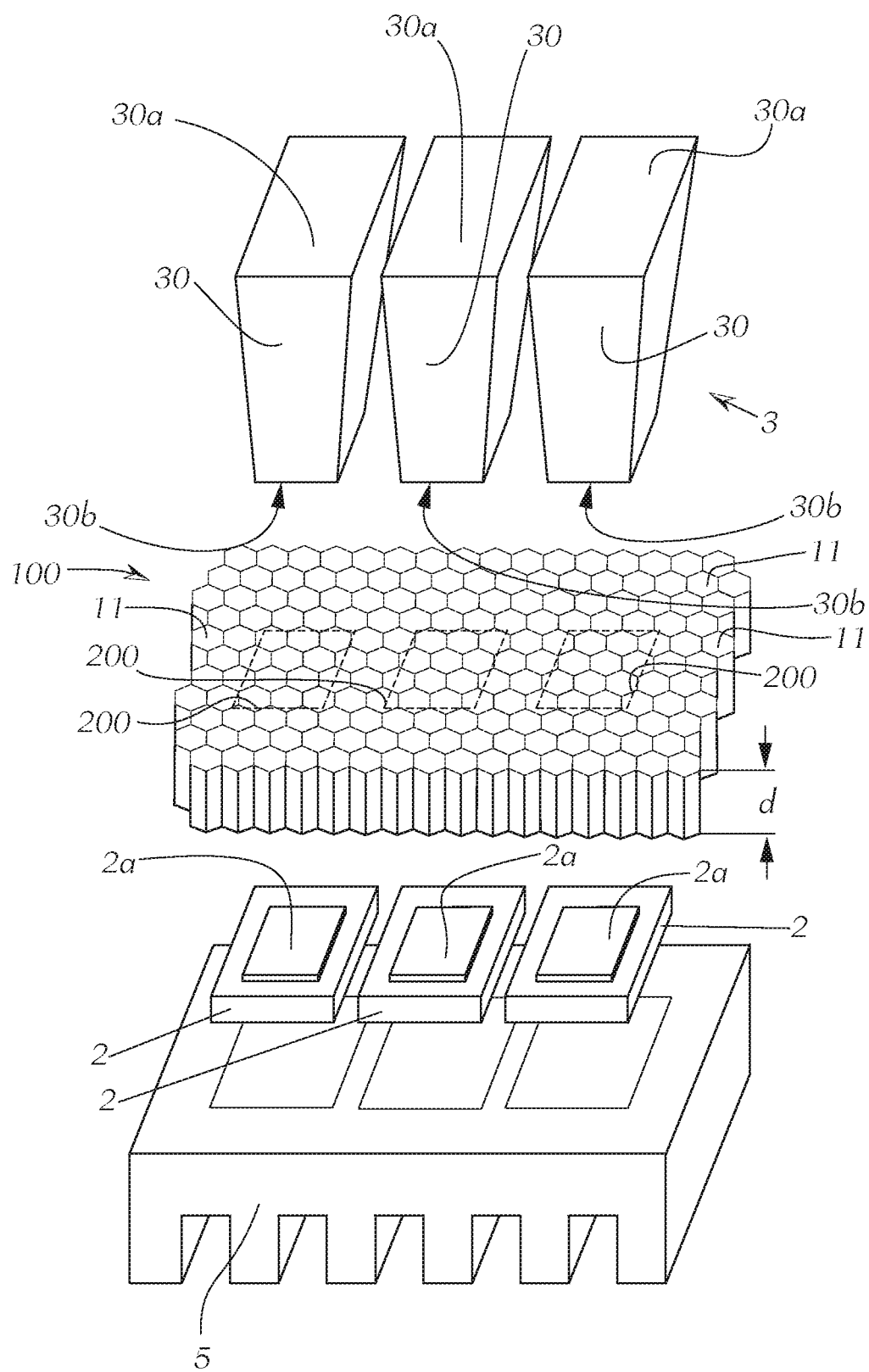
FIG. 2 shows a schematic exploded view of an inventive lamp unit in the area of a light conducting rod bundle.

By contrast, the light guides in FIG. 2 are in the form of totally reflecting optical elements, e.g., plastic or glass bodies, into which light exiting from the light exit surfaces 2a of the light-emitting diode 2 assigned to each of them is coupled into the light coupling surfaces 30b, propagates by total reflection in the optical elements (light guides) 30, and exits through light exit surfaces 30a, and is radiated into an area in front of the lamp unit by means of lens 4.

The selection of different embodiments of the light guides in FIG. 1 and FIG. 2 is intended to express, on the one hand, that the form of the light guides is unimportant for the invention, and, on the other hand the embodiment in FIG. 2 allows clearer discussion of the invention.

To prevent easy damage to or destruction of the light guide units 30 shown as examples in FIGS. 1 and 2, due to the thermal and optical loads produced by the radiation and heat from the light sources, especially in the light coupling areas of the light guides, an optical element 100 is provided between the light sources 2 and the light coupling surfaces 30b of the light guides 30. As can easily be seen by comparing FIG. 2 and FIG. 3, this optical element 100 is a so-called light conducting rod bundle 100, which consists of several or many light conducting rods 10 (FIG. 3) that are joined together into light conducting rod bundle 100. This light conducting rod bundle 100 is, for example, a plate-shaped element as shown.

Figure 3:
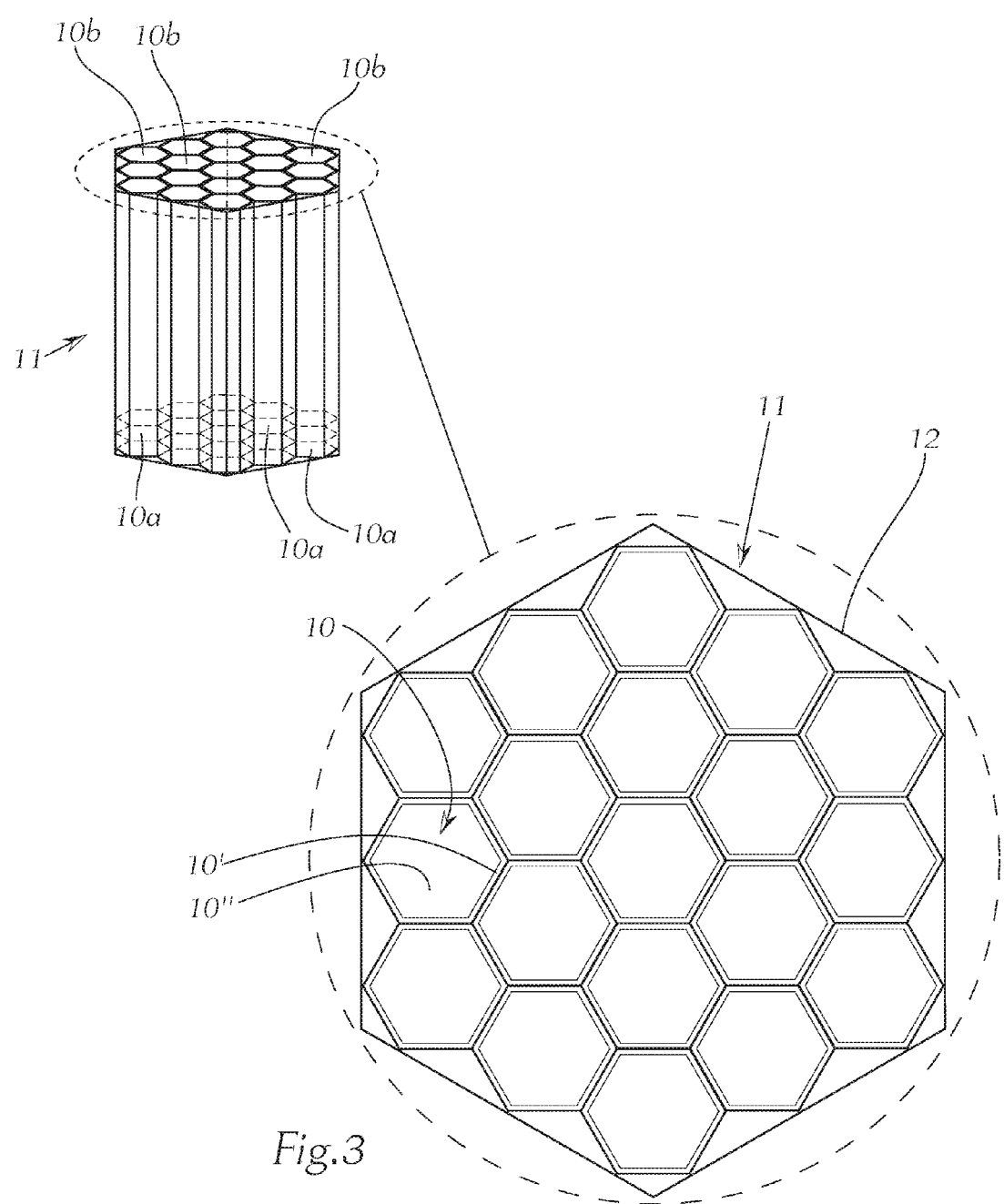
FIG. 3 shows a detail view of a fiber rod with several light conducting rods.

In the embodiment shown in FIG. 2, the bundle 100 consists of a number of fiber rods 11, each fiber rod 11 in turn consisting of a number of light conducting rods 10, as shown in FIG. 3. Thus, in every case a number of light conducting rods 10 is joined into a fiber rod 11, and several or many fiber rods 11 form the light conducting rod bundle 100 (also referred to as the fiber rod bundle, also referred to below simply as the "bundle").

The number of light conducting rods arranged in a fiber rod is typically 7, 19, 37, 61, 91, etc.

To allow the light conducting rods 10 to be packed as densely as possible, light conducting rods 10 have a hexagonal cross section. In the same way, it is preferable for fiber rods 11 to have a hexagonal cross section.

However, in theory it is also possible for bundle 100 to be manufactured not by first joining the light conducting rods into fiber rods, but rather by making bundle 100 directly from light conducting rods. However, for reasons having to do with production engineering and mechanical stability, it can be advantageous for the light conducting rods 10 first to be joined into fiber rods 11, as shown in FIG. 3.

The embodiment shown in FIG. 3 also provides that the light conducting rods 10 of a fiber rod 11 are surrounded by a covering 12, preferably a glass covering. Such a glass covering can be provided to hold together the light conducting rods 10 while the fiber rods are being manufactured, and then become a component of the fiber bundle 11, as described in DE 10 2010 052 479 A1.

To achieve optimal total reflecting properties in the light conducting rods 10, the light conducting rods 10 are, for example, made in the form of glass rod/tube systems, with a cladding glass 10' as a tube and a core glass 10" as a rod, the core glass 10" being surrounded by the cladding glass 10'. In this case, the refractive index of core glass 10" is greater than that of cladding glass 10'. This allows the transmission of light as a consequence of reflection at the interface of the inner and outer glass in a light conducting rod 10.

To make the bundle mechanically stable, it is advantageous for the light conducting rods 10 of a fiber rod 11 to be connected together, preferably fused together. It is also advantageous for the fiber rods 11 of a fiber rod bundle 100 to be connected together, preferably fused together. This produces mechanically homogeneous fiber rods 11 or mechanically homogeneous fiber rod bundles.

The light conducting rods 10 or fiber rods 11 of a light conducting rod bundle 100 run parallel to one another, as can easily be seen in FIG. 2. This results in a bundle 100 with a thickness d.

The interposition of the optical element in the form of a light conducting rod bundle 100 between light sources 2 and light guide unit 30 can thermally decouple light guide unit 30 from light sources 2, so that light guide unit 30 experiences no thermal interference due to light sources 2.

The inventive structure of the interposed element in the form of a light conducting rod bundle 100, consisting of multiple light conducting rods 10, in which the input light propagates by means of total reflection, allows a light source 2 to be projected onto the coupling area 30*b* of the light guide 30 assigned to it as exactly as possible, preventing a light source 2 from coupling light into another light guide than the one assigned to it.

The smaller the cross section of these individual light conducting rods 10, i.e., the more light conducting rods 10 are used to project a light source 2 (i.e., its light exit surface 2*a*) onto the assigned coupling area 30*b* of light guide 30, the more exactly the light exit surface 2*a* is projected onto coupling area 30*b*.

The fact that light sources 2 or their light exit surfaces 2*a* do not, as a rule, lie directly against one another, but rather are a certain distance away one another, as can be seen in FIG. 2, also reliably ensures, if light conducting rods 10 have a correspondingly small diameter, that a light source 2 does not, not even to a small extent (or only to an irrelevant extent), couple light into a light guide 30 not assigned to it.

Here it should also be taken into consideration that light guides 30 taper, as a rule in the direction toward light sources 2, as can be seen in FIG. 2, i.e., the light coupling surface 30*b* of a light guide is smaller than its light decoupling surface 30*a*. Therefore, the light coupling surfaces 30*b* or light coupling areas 30*b* of adjacent light guides are separated from one another.

Of course it is also possible for there to be light guides that do not taper, however adjacent light coupling areas are separated by a certain distance.

Now every light source 2 couples light essentially exclusively or actually exclusively into light conducting rod coupling areas 10*a* of [the] light conducting rods 10 assigned to the respective light source 2, and couples, essentially exclusively or actually exclusively, the light of an assigned light source 2 exiting from the light conducting rod decoupling areas 10*b* into the light coupling surface 30*b* of the light guide 30 assigned to the respective light source 2.

As is shown in a rough schematic manner in FIG. 2, every light exit surface couples light into light conducting rods 10 that lie within an (imaginary) rectangle 200. The light coupling surfaces 30*b* are usually larger than the light exit surfaces 2*a*; examples of typical values are for the light exit surfaces 2*a* are about 0.7 mm×0.7 mm, and those for a light coupling surface 30*b* are about 1 mm×1 mm, so that the light is usually coupled into the assigned light coupling surface 30*b*, even in the case that light is coupled from a light exit surface 2*a* into a light conducting rod that no longer lies opposite the light exit surface 2*a*, or does so only partially.

Moreover, since the light coupling surfaces 30*b* are separated from one another, if the number of light conducting rods is sufficiently large, that is, if the resolution is high, it can be ensured that light of a light source does not get into a light guide that is not assigned to it, even if some light conducting rods do not couple light into the assigned light guide, or do so only partially.

Thus, the term "a light conducting rod assigned to a light source" is understood to mean a light conducting rod that couples light completely into the assigned to light guide. The term can also be understood to mean light conducting rods that do not couple light into the assigned light guide, or do so only partially, but without coupling light into an unassigned to light guide ("allowable" light conducting rods). The larger the number of light conducting rods per unit area, the fewer "allowable" light conducting rods there are, and the more light from the light source gets into the assigned light guide.

It is also provided that light conducting rod bundle 100 is arranged at a light source distance from light sources 2, the light conducting rod bundle 100 preferably having the same distance from all assigned to light sources 2, that is lying parallel to the plane of the light exit surfaces 2*a*.

This light source distance is the normal distance from the light exit surface 2*a* of light source 2 to the light coupling surface of light conducting rod bundle 100; this light coupling surface of light conducting rod bundle 100 is formed by the light coupling surfaces 10a of the light conducting rods.

It is especially advantageous for the light source distance to approach zero or preferably be zero, as is shown in FIG. 5. The reason why is that a light-emitting diode 2 has a spatial radiation behavior, as is common knowledge; this is shown in a rough schematic manner in FIG. 4. Arranging surface 2a as close as possible to the light conducting rods, as illustrated in FIG. 5, can have the result that light is only actually coupled into the assigned light conducting rods 10, or at most that it is additionally coupled into "allowable" ones.

It is also provided that the light conducting rod bundle 100 is arranged so that the distance from the light guide unit to the light coupling surfaces 30b of the light guide unit 3 is preferably zero.

In the light conducting rods 10, light propagates as a consequence of total reflection, as is shown in FIG. 5. Here it should be pointed out that to make the schematic beam paths in FIG. 5 easier to see, the light conducting rods 10 not are not true to scale, and have a (substantially) larger diameter than in reality. (The diameter of a light conducting rod 10 in FIG. 5 is about that of a fiber rod 11 in FIG. 2.). The cladding and core structure of the light conducting rods shown in FIG. 3, is also not shown in FIG. 5, to make the portrayal clearer.

Light beams that do not meet the total reflection condition, that is, that impinge on the cladding of light conducting rod 10 at an angle smaller than the critical angle for total reflection, exit from the light conducting rod 10 into which they were coupled. To prevent these light beams from coupling into an unassigned light guide, it is also preferable that the thickness d of the light conducting rod bundle 100, i.e., the distance between the surface of the light conducting rod bundle 100 facing light sources 2 and the surface of the light conducting rod bundle 100 facing the light guide unit 3, has or exceeds a defined minimum value, which is selected so that light that exits from the side of a light conducting rod assigned to a light source at most gets into allowable light conducting rods. This corresponds to light conducting rods having a diameter of about 100 μm.

In this regard, a higher number (greater density) of light conducting rods is also advantageous—the more light conducting rods that must be traversed by a light beam that enters them because it does not meet the total reflection condition, the weaker it becomes. If a light beam is sufficiently weakened in this way before it enters an unassigned light guide, then it is already weak enough that its intensity is negligible.

The thickness d must also be selected in such a way that the light guides are sufficiently thermally decoupled from the light sources. Thus, the thickness d is also dependent on the material used in the light conducting rod bundle, that is, its thermal conductivity. Typically, the thickness d is on the order of a few millimeters.

In theory, the light exit surfaces 2a of a light-emitting diode can be of any shape. However, typical shapes are rectangular or square. For example, a typically used LED chip of the type Osram Compact LED chip has a light exit surface (luminous surface) 2a that is square (one corner being rounded off toward the inside), and side lengths of about 0.7 mm. In a specific arrangement of such LED chips, these are arranged in 3 rows and several gaps, and adjacent LED chips in a row are spaced about 2 mm apart from one another. The rows themselves are also spaced apart from one another by 2 mm (top and middle row) or 2.5 mm (middle and lower row). The distance is always measured as the center-to-center distance of two adjacent LED chips, the center being the midpoint of the square bordering the light exit surfaces. The above-mentioned measurements are typical values of a specific application and serve here to illustrate the dimensions with an example. In the above-mentioned example, the resulting light exit surface is about 0.49 mm$^2$.

In a well-functioning embodiment, about 50-100 light conducting rods are provided for one light exit surface. This corresponds to light conducting rods having a diameter of about 100 μm. (To simplify the calculation, if we assume that the light conducting rods have circular cross sections whose surfaces ideally completely cover the light exit surfaces, then given a light exit surface of 0.49 mm$^2$ and a light conducting rod diameter of 100 μm, this gives about 62 light conducting rods for this light exit surface.)

Theoretically, it is also conceivable for there to be fewer light conducting rods; in particular, it is also possible for there to be exactly one light conducting rod per light exit surface. However, this light conducting rod must then be shaped as exactly as possible to match the shape of the light exit surface, and must also be positioned very exactly, which has the disadvantage that manufacturing and assembly tolerances once again become important, and assembly requires more effort.

Thus, it is fundamentally advantageous to use a large number of light conducting rods per light source. Thus, it is advantageous for every light source 2 to have many light conducting rods 10 assigned to it. If these light conducting rods are joined into one (or more) light conducting rod bundles, the bundle (or each of the bundles) also consists of many light conducting rods.

It is especially advantageous if the number of light conducting rods per light exit surface/light source is ≥10. For example, having 50-100 light conducting rods per light exit surface has turned out to be expedient.

The light exit surface can be projected onto the assigned to light guide even better if the number of light conducting rods is ≥100, preferably 1,000; about 5,000-10,000 light conducting rods per light exit surface has proved to be a good number. (In the above example, for a light conducting rod with [a diameter of] 10 μm the result is about 6,242 light conducting rods for the light exit surface.)

Joining light conducting rods 10 in a light conducting rod bundle 100 or fiber rods 11 in a single fiber rod bundle 100 has the advantage that when the inventive lamp unit is assembled, tolerances and inaccuracies do not have to be taken into consideration, or have to be taken into consideration only to a small extent, other than would be the case if, for example, only a single totally reflecting light conducting body were arranged between each light source and each light coupling area of a light guide.

This has the advantage that the light sources and the light guide unit only need to have a single additional optical element incorporated between them, whose lateral slippage in directions perpendicular to a normal to the light exit surfaces of the light sources is completely insignificant, as long as the number of light conducting rods is sufficiently large, since if the resolution is high enough (i.e., if the number of light conducting rods is sufficiently large) the light exit surface is projected almost 1:1 onto the light coupling area of the assigned light guide, and only small quantities of light get into adjacent light conducting rods that do not couple light into the assigned light coupling area. In addition, this light does not, for the most part, or even at all, get into unassigned light guides, so that there also cannot be detrimental optical effects.

Thus, the invention allows optimal thermal decoupling of the light guides or light guide unit from the light sources, as described above. Therefore, it is advantageous if a material with low thermal conductivity is used for the light conducting rods, and thus for a light conducting rod or fiber rod bundle, in which light can propagate by means of total reflection. As was already mentioned above, glass is an example of a material that is very suitable for this.

The invention claimed is:

1. A lamp unit for a headlight, the lamp unit comprising:
multiple light sources;
a light guide unit; and
a downstream projector lens,
wherein the light guide unit has multiple light guides, each light guide having one light decoupling surface and one light coupling surface, and each light source coupling light into exactly one light guide assigned to it through one light coupling surface,
wherein the light sources and the light coupling surfaces of the light guides have light conducting rods arranged between them, which are joined into at least one light conducting rod bundle, each light source having a plurality of light conducting rods assigned to it, and each light source coupling light essentially exclusively into the light conducting rod coupling areas of light conducting rods assigned to the respective light source, and the light of an assigned light source that exits from the light conducting rod decoupling areas being coupled essentially exclusively into the light coupling surface of the light guide assigned to the respective light source to reduce crosstalk.

2. The lamp unit of claim 1, wherein a number of the light conducting rods are joined into a fiber rod, and the at least one light conducting rod bundle consists of a number of such fiber rods, so that each light source couples light into a number of such fiber rods.

3. The lamp unit of claim 2, wherein the fiber rods have a square hexagonal cross section.

4. The lamp unit of claim 2, wherein the light conducting rods of a fiber rod are surrounded by a glass covering or other covering.

5. The lamp unit of claim 2, wherein the light conducting rods of a fiber rod are fused together or otherwise connected together.

6. The lamp unit of claim 2, wherein the fiber rods of a fiber rod bundle are fused together or otherwise connected together.

7. The lamp unit of claim 2, wherein the fiber rods of a fiber rod bundle run parallel to one another.

8. The lamp unit of claim 1, wherein the light conducting rods are joined into precisely one light conducting rod bundle.

9. The lamp unit of claim 1, wherein the light conducting rods have a square or hexagonal cross section.

10. The lamp unit of claim 1, wherein the light conducting rods are made in the form of glass rod/tube systems, with a cladding glass as a tube and a core glass as a rod, the core glass being surrounded by the cladding glass.

11. The lamp unit of claim 10, wherein the core glass has a refractive index that is greater than that of the cladding glass.

12. The lamp unit of claim 1, wherein the light conducting rods of a light conducting rod bundle are fused together or otherwise connected together.

13. The lamp unit of claim 1, wherein the light conducting rods of a light conducting rod bundle run parallel to one another.

14. The lamp unit of claim 1, wherein the at least one light conducting rod bundle is arranged at a light source distance from the light sources.

15. The lamp unit of claim 14, wherein the light source distance approaches zero or is zero.

16. The lamp unit of claim 1, wherein the at least one light conducting rod bundle is arranged at a light guide unit distance from the light coupling surfaces of the light guide unit.

17. The lamp unit of claim 1, wherein the thickness of the at least one light conducting rod bundle, which is the distance between the surface of the light conducting rod bundle facing the light sources and the surface of the light conducting rod bundle facing the light guide unit, has or exceeds a defined minimum value, which is selected so that light exiting from the side of a light conducting rod assigned to a light source at most gets into allowable light conducting rods.

18. The lamp unit of claim 17, wherein two or more light conducting rod bundles are arranged directly adjacent to one another, one after the other in the light exit direction.

19. The lamp unit of claim 1, wherein the at least one light conducting rod bundle is plate-shaped.

20. The lamp unit of claim 1, wherein the light conducting rods are gradient-index rods.

21. The lamp unit of claim 1, wherein at least one light conducting rod bundle consists of a plurality of light conducting rods.

22. The lamp unit of claim 1, wherein each light source has 10 or more light conducting rods assigned to it.

23. The lamp unit of claim 22, which has from 50 to 100 light conducting rods per light source.

24. The lamp unit of claim 1, wherein each light source has 100 or more of the light conducting rods assigned to it.

25. The lamp unit of claim 24, which has from 5,000 to 10,000 light conducting rods per light source.

26. The lamp unit of claim 1, wherein the light sources are LEDs, each LED light source comprising at least one light-emitting diode.

27. The lamp unit of claim 26, wherein each LED light source is separately controllable, allowing it to be turned on or off and/or dimmed separately.

28. The lamp unit of claim 27, wherein each light-emitting diode of the LED light source is separately controllable, allowing it to be turned on or off and/or dimmed separately.

29. A vehicle headlight with at least one lamp unit of claim 1.

30. The lamp unit of claim 1, wherein the at least one light conducting rod bundle is the same distance to all assigned light sources.

* * * * *